Patented Sept. 14, 1954

2,689,232

UNITED STATES PATENT OFFICE 2,689,232

COPOLYMERS OF CYCLIC DIENE COMPOUNDS AND ETHYLENICALLY UNSATURATED COMPOUNDS

Howard L. Gerhart, Milwaukee, Wis., assignor to Pittsburgh Plate Glass Company, Allegheny, Pa., a corporation of Pennsylvania No Drawing. Application August 11, 1951, Serial No. 241,495

12 Claims. (Cl. 260—23.7)

The present invention relates to polymers of cyclopentadiene and it has particular relation to polymers of cyclopentadiene which are modified by conjoint polymerization with a compound containing the vinylic group ($H_2C=C<$), e. g., styrene.

One object of the invention is to provide a novel resinous polymer or gum from cyclopentadiene or its lower homopolymers which is valuable for many uses.

A second object of the invention is to provide a novel polymer that can be cooked into drying oil and varnish formulations to produce valuable coating compositions and resins.

A third object of the invention is to provide a resinous or gum-like polymer of cyclopentadiene or its lower homopolymers which successfully can be added to a drying oil to be bodied and which when so added promotes the rate of bodying of the oil.

A fourth object of the invention is to provide a resinous polymer of cyclopentadiene which is readily soluble in hydrocarbon solvents or in glyceride oils and which is free of residues of catalyst and of other objectionable materials.

A fifth object of the invention is to provide a process of polymerizing styrene and cyclopentadiene, or its lower homopolymers which can be successfully performed upon a mixture thereof with or without the inclusion of diluents.

A sixth object of the invention is to provide a polymer product of cyclopentadiene that can be cooked into a drying oil to provide a cyclopentadiene modified product without the use of a pressure apparatus.

These and other objects of the invention will be apparent from consideration of the following specification and the appended claims.

It has heretofore been proposed to prepare resinous products by polymerizing cyclopentadiene. However, the resultant homopolymer products as heretofore obtained have, in many instances, been characterized by instability in air and by a high degree of insolubility in many of the solvents employed in the paint and varnish industry and also by insolubility in drying oils.

Furthermore, in most cases, the polymerization has heretofore been conducted by use of catalytic bodies such as the well known Friedel-Crafts catalysts which are halide salts of tin, aluminum or similar metals. Such catalysts obviously are an item of expense. Also, it was necessary to eliminate the catalysts from the polymers at the conclusion of the reaction in order to prevent overpolymerization or for other reasons. To eliminate the catalyst, it has been proposed to add water to hydrolyze the salts and then to add alkali and ultimately to wash and dry the products. Such technique is cumbersome and expensive.

In U. S. Patent 2,259,496 to Soday, it is proposed to form copolymers of certain so-called "soluble polymers" of cyclopentadiene by heating solutions of polycyclopentadiene and styrene. The resultant copolymers are apparently soluble in solvents such as mineral spirits and, in some instances at least, they are soluble in China-wood oil. In order to prepare a "soluble" polymer that could be employed in the reaction, it is proposed to effect polymerization of cyclopentadiene monomer at a relatively low temperature and in the presence of an aluminum chloride-diethyl ether complex as a catalyst. The reaction apparently is conducted in the presence of a diluent such as toluol or xylene. The preparation of a "soluble" polymer of cyclopentadiene suitable for use in the patented process thus introduces many, if not all, of the objectionable features which have heretofore characterized the prior art.

In my prior Patent 2,392,732, I have described the preparation of copolymers of cyclopentadiene or dicyclopentadiene and glyceride oils by subjecting a mixture of the two to heat and pressure in the absence of catalysts. The resultant copolymers possess exceptionally rapid rates of air drying and may be successfully employed as vehicles in paints and varnishes, or where the copolymers are high in cyclopentadiene content, the resultant resins may be dissolved in, or admixed with additional drying oil, in the manner of varnish maker's gums to provide solutions that will dry rapidly.

According to this invention novel and valuable copolymers of cyclopentadiene and a compound containing a vinylic ($>C=CH_2$) group, notably styrene, have been provided. Such copolymers are prepared by heating together a vinylic compound, notably styrene and cyclopentadiene or a lower homopolymer of cyclopentadiene usually in the absence of a catalyst.

Cyclopentadiene is of the formula:

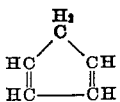

A dimer thereof which may be employed in the practice of the present invention, is understood to be of the formula:

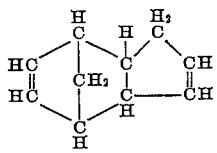

The corresponding trimer is understood to be of the formula:

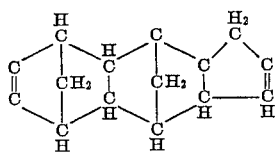

The tetramer, similarly, is of the probable formula:

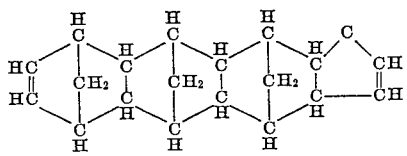

The homopolymers of foregoing type become more and more insoluble as the molecular weight increases.

The general formula of the polymers of cyclopentadiene suitable for use in the practice of the invention, may be represented as follows:

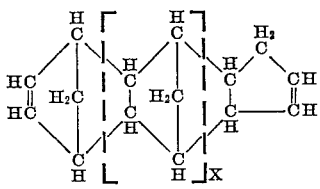

where X is an integer from 0 to 2.

In the practice of the invention, cyclopentadiene or a lower homopolymer thereof such as dicyclopentadiene, tricyclopentadiene or tetracyclopentadiene are employed as primary ingredients. It is to be understood that, essentially, the reaction is the same, regardless of whether cyclopentadiene or its lower homopolymers are employed as starting materials because cyclopentadiene and its dimer, when heated up in the system herein disclosed, initially tend to form trimers, tetramers and perhaps pentamers, which are insoluble compounds in nearly all solvents. The lower homopolymers, therefore, tend first to precipitate out of solution as solids in the vinylic monomer. However, as the reaction proceeds, and especially as the reaction temperature rises, these insoluble polymers disappear and the system becomes completely miscible. The polymers formed at this stage are soluble in glyceride drying oils, xylene, toluene and the like. Doubtless the insoluble polymers initially formed are cracked and the resultant cyclopentadiene reacts with the vinylic compound, by copolymerization to provide soluble products. The final results are much the same regardless of whether cyclopentadiene or its lower insoluble homopolymers are employed as starting reagents. If cyclopentadiene is employed, it at least in part, forms the lower homopolymer and this later cracks to provide cyclopentadiene which copolymerizes with the vinylic compound. If the lower homopolymers of cyclopentadiene are introduced initially, they crack to provide cyclopentadiene that corresponds to the homopolymers formed in situ.

By polymerizing cyclopentadiene (or lower homopolymer) and a vinylic compound such as styrene, a gum-like product is produced which, if proper conditions are maintained in the reaction, is soluble in hydrocarbons such as toluol, xylol, and paraffinic naphtha and which is also compatible with, or soluble in, various glyceride oils such as linseed oil, soya bean oil, safflower oil, tung oil and many others so that the oils may be modified therewith by a simple heating operation without recourse to pressure apparatus.

In the preparation of the products as herein disclosed, various techniques may be resorted to. However, a simple and convenient method comprises the admixture of cyclopentadiene (or a lower homopolymer as herein disclosed) with an appropriate amount of a vinylic compound such as styrene. For production of a gum there should be at least two moles of cyclopentadiene or its equivalent for each mole of the compound, e. g., styrene. The ratio of cyclopentadiene, or its equivalent, to a compound containing $H_2C=C<$ can be greatly increased. Proportions of 10 or even 15 moles of cyclo or dicyclopentadiene for each mole of such compound as styrene are within the contemplation of the invention.

The cyclopentadiene (or equivalent) and the ethylenically unsaturated compound may be diluted with paraffinic naphtha or other convenient non-reactive diluent. However, it is a feature of the present invention that such diluents are not required. In most instances, it is more economical to operate without them. The reactive components of the system preferably consist essentially of the vinylic compound and cyclopentadiene or its lower homopolymers as herein described.

In order to effect polymerization or conjoint polymerization of cyclopentadiene (or equivalent) and a compound such as styrene containing the group $H_2C=C<$, the mixture preferably is heated under pressure. To this end, the mixture may be introduced into a pressure apparatus such as an autoclave which will withstand substantial superatmospheric pressure, for example up to 100 or 200 pounds per square inch or more. Usually the pressure will be allowed to increase naturally, that is, as a result of the reaction. Additional hydrostatic pressure may be applied to the reaction mixture since it promotes the reaction. Any added pressure within the capacity of the apparatus can be applied. About 25 pounds per square inch and upward can be regarded as substantial. Such added pressures can be applied by introduction of carbon dioxide or like inert gas at or near the initiation of the heating operation when the reaction pressure is slight or non-existent. It can also be applied at any subsequent stage of the reaction.

Preferably the autoclave is equipped with a source of heat such as an electrical heating coil or a steam coil or the like. It is also desirable that it be equipped with a pressure gauge that will admit of following the course of the reaction through changes in the pressure and it is desirable to provide an appropriate thermometer, thermocouple or the like to admit of observation of temperature changes. Likewise an agitator is convenient as a means of quickly attaining thorough admixture of the reactants in the autoclave. Further means of following the course of reaction and determining when a satisfactory degree of completion has been obtained, involves the provision of a sampling cock, through which small samples may be taken off from time to time for purposes of viscosity tests, solubility tests, or such other convenient and conventional tests as are desired, to determine the completion of the reaction.

The application of heat, in order to promote the reaction has been referred to. However, the reaction within itself is exothermic and when once started will often progress under its own evolved heat. If the mixture of reactants is large, the exothermic heat may be so great as to cause an excessive rise in temperature, thus inducing charring of the reaction mixture, discoloration or other undesirable effects. To obviate the possibility of such effects, it is often desirable to equip the autoclave with a cooling jacket, or a cooling coil by means of which cooling fluids may be circulated in heat exchange relation to the reaction mixture thus admitting of proper control of the reaction.

Normally, the reaction temperature is maintained within an appropriate range of at least 200 and preferably 250 or 260° to 300 or 350° C. In this range, soluble resin like gums are formed. These can be dissolved in drying oils or petroleum naphtha to provide coating compositions.

The time of the reaction will depend upon the temperature as well as the degree of polymerization desired in the finished product. Naturally, if high viscosity is desired, the reaction should be continued for a longer period than if products of lower viscosity are desired. In any event, the reaction should be discontinued before insoluble products are formed. The completion of the reaction can usually be determined with reasonable accuracy by observation of gauge pressure within the autoclave. As the reaction nears completion, the pressure will drop off sharply. Unless outside heat is supplied, the temperature of the reaction mass will also tend to drop. If for any reason these criteria are insufficient to determine completion of the reaction with sufficient exactness, small samples may be drawn off and tested for solubility in xylene or naphtha and also for viscosity.

It has already been indicated that in the initial states of the reaction dicyclopentadiene tends to form at least some insoluble lower homopolymers such as tetramers and pentamers. These may separate as a separate phase in the system. However, as the reaction proceeds, they are cracked during the reaction and a completely miscible, naphtha and oil soluble product is attained. It is usually desirable to continue the reaction until this stage is attained. If the reaction is excessively prolonged, insoluble products may again appear. It is normally desirable to discontinue the reaction before the latter stage is attained.

Usually the reaction will be completed within a period of about 2 to 20 hours, at least to a sufficient degree for most purposes.

The use of an autoclave as a reaction chamber has been particularly discussed. However, it will be apparent that appropriate mixtures of cyclopentadiene or lower homopolymers thereof, and compounds such as styrene containing the group $H_2C=C<$ may be reacted in other appropriate containers. For example, the mixture may be conducted continuously or intermittently through an elongated tube or coil where it is appropriately heated to reaction temperature. The unpolymerized mixture, with or without diluents such as paraffinic naphtha, is introduced into the tube at one end and a finished gum or resin is drawn off at the other end. Care should be observed to assure that the mixture passing out of the reaction system is in a reasonable state of fluidity. This may be attained by maintenance of adequate temperature, use of diluents and by stopping the reaction before it has advanced too far.

It has been indicated that compounds containing the group $H_2C=C<$ can be reacted with cyclopentadiene or its polymers which are at least in part insoluble in the monomer to provide useful gums. Styrene is an outstanding example of a compound containing such group which can be so reacted.

The copolymers thus obtained are essentially two-component copolymers in which the cyclopentadiene to styrene ratio ranges between 2 to 15 parts by weight per part by weight of styrene. It should be understood that a portion or even all of the styrene may be replaced by other compatible, liquid compounds containing a terminal $>C=CH_2$ group; said compounds being free of conjugate diolefinic unsaturation and being copolymerizable with the cyclopentadiene, or a lower homopolymer thereof. Valuable copolymers may be obtained when 50% more or less of the styrene is replaced with a polymerizable miscible, monomeric, nonresinous ester or ether which contains one or more vinyl groups ($CH_2=C<$) in which one of the carbons of such groups is the second carbon atom from the oxygen bridging atom of an ester or ether linkage.

Such compounds include:

Esters of ethylenically unsaturated alcohols containing up to 4 or 5 carbon atoms such as vinyl acetate, allyl acetate, diallyl maleate, diallyl carbonate, allyl carbamate, diallyl fumarate and like esters of unsaturated alcohols such as vinyl, allyl, methallyl, 2 chloroallyl esters and the like.

Esters of unsaturated acids including methyl acrylate, methyl methacrylate, methyl alpha chloracrylate, dimethyl itaconate and like esters of lower saturated alcohols such as ethyl, or propyl alcohols containing up to 5 carbon atoms or of unsaturated alcohols including vinyl, allyl, oleyl, methallyl esters and polyhydric alcohol esters such as glycol acrylate, glycol dimethacrylate, etc.

Ethers including divinyl ether, vinyl ethyl ether, diallyl ether, dimethallyl ether.

In general the resinous polyesters such as glycol maleate etc. are not miscible and therefore are not used.

It is also within the scope of the invention to replace a portion or all of the styrene by acrylonitrile or vinyl chloride, or 3 vinyl cyclohexene or dipentene. The latter two are hydrocarbons containing non-conjugate double bonds one of which is terminal ($>C=CH_2$).

The interpolymer products may be employed to modify linseed oil, soya bean oil, safflower oil, tung oil or any other appropriate oil conventionally employed in the formulation of paints and varnishes. The gums can readily be cooked into linseed or soya bean oil or even tung oil in an open kettle such as is available in practically any varnish making establishment, thus obviating the use of pressure apparatus in the introduction of cyclopentadiene into the oil.

Specific examples illustrating the application of the principles of the invention to the preparation of a gum or resin from cyclopentadiene and styrene are as follows:

Example I

A charge comprising: 1 part by weight of styrene and 2.3 parts by weight of dicyclopentadiene (the rest of the mixture) was introduced into an autoclave, and was heated to and maintained at a temperature of approximately 250° C. for a period of 3 hours, or until a gum which was hard when cold was formed. The resultant product was drawn off from the reaction chamber and cooled. The resultant hard gum can be cooked with vegetable oils such as linseed oil and soya bean oil to form compositions as herein disclosed.

Example II

A mixture of 20 parts by weight of styrene and 80 parts by weight of dicyclopentadiene was introduced into an autoclave as described in Example I. The mixture was heated up to a temperature of 270° C. and held in the range of 270° to 280° C. for two hours. The maximum pressure developed was 70 pounds per square inch. A product was obtained which was a light amber, brittle resin having a softening point of 199° C. It could be cooked into linseed and soya oil as previously described.

Example III

A mixture of 10 parts by weight of styrene and 90 parts by weight of dicyclopentadiene was copolymerized in a pressure autoclave. The temperature of polymerization was 265 to 270° C. and the heating time was 2½ hours. The maximum pressure developed was 75 pounds per square inch. A resin of light color and having a softening point of 201° C. was obtained.

Example IV

A mixture of 20 parts by weight of vinyl acetate and 80 parts by weight of dicyclopentadiene was copolymerized in a pressure autoclave as above described. The reaction temperature of 270 to 300° C. was maintained for 3 hours. During that time, a pressure of 103 pounds per square inch were developed. A brittle gum was obtained having a softening point of 140° C. It can be dissolved in naphtha or xylol and in drying oils, e. g., linseed oil, to provide paint, lacquer and varnish formulations.

Example V

One part of acrylonitrile and 2.3 parts of dicyclopentadiene were heated in an autoclave under a temperature schedule that increased from 250 to 270° C. over a period of 6 hours. A very light colored resin was produced.

The product is a hard gum insoluble in naphtha, soluble in xylene and soluble in acetone and cyclohexanone. It reacts with linseed oil when heated to 270° C. to provide a clear varnish.

In order to introduce the gums or resins into an oil such as soya bean oil or linseed oil, a mixture of the oil and resin may be introduced into an open kettle or other varnish maker's kettle with or without a blanket of inert gas such as carbon dioxide. The mixture will dissolve at a temperature of 200 to 300° C. to form a homogeneous solution which can be cooled without separation of the constituents. This solution can further be diluted with naphtha or with other diluents, or it can be modified with pigments, dyes and other resins to meet particular requirements.

The proportion of resin or gum to be employed with a glyceride oil such as linseed oil or soya bean oil is susceptible of substantial variation. Proportions of 1 to 50% by weight of resin upon the basis of the oil-resin mixture are contemplated. The products as obtained have drying properties and will dry substantially faster than the unmodified oil. In order to promote these drying properties, it is permissible to add to the oil-resin solution, conventional siccatives such as oleates, linoleates, naphthenates or the like of nickel, cobalt, manganese, lead or other metals which are commonly employed in the preparation of driers for the paint and varnish industry. The driers may be employed in a proportion of .01 to 5%, based upon the oil content of the mixture.

Many of the copolymer products may also be employed as promoters of bodying of drying oils such as linseed oil, soya bean oil and the like. When so employed, they apparently react with the glyceride molecules, presumably by addition. For example, resin in a proportion of from about 1 to 10% by weight, or more, base upon the oil-resin mixture may be added to a drying oil such as linseed oil. The mixture may then be bodied by heating it up to a temperature of about 550° to 600° F. The mixture will body quite rapidly. Bodying should be continued until the viscosity, as determined by appropriate tests, has risen to the desired value.

It further may sometimes be desirable to add the soluble copolymers of cyclopentadiene and styrene (or other compound containing a $>C=CH_2$ group) as herein disclosed to alkyd resins and notably long oil alkyd resins such as are obtained by esterifying glycerol and phthalic acid in molecular proportions in a drying oil such as linseed oil or soya bean oil. It is conventional in the preparation of this type of alkyd to subject the oil component to alcoholysis with glycerol whereby to form the partial glyceryl ester. This partial ester may then be reacted with maleic acid or phthalic acids to provide an alkyd body which is a polyester of the dicarboxylic acid and glycerol which may include 50% or more by weight of oil based upon the mixture of oil and alkyd body. The addition of a gum as herein disclosed to such alkyd body is within the scope of the invention. Obviously the body so prepared should be liquid at normal temperatures.

Further examples illustrating the invention are as follows:

Example VI

In this example, 375 grams of dicyclopentadiene and 125 grams of dipentene were charged into an autoclave. The air was replaced with inert gas namely combustion gas and the autoclave was sealed. It was then heated with agitation to 240° C. in 50 minutes and held within a range of 240 to 256° C. for 6 hours. A maximum pressure of 145 pounds per square inch was reached after 10 minutes at the temperature of 240° C. The pressure dropped rapidly during the next 10 minutes and then more slowly until it reached a minimum of 86 pounds per square inch at 256° C. The progress of the reaction was further followed by removing samples from the autoclave periodically and determining the body of the reaction product at 50% by weight dilution in mineral spirits. There reaction was terminated when a body of "D" of the solution on the Gardner-Holdt scale was reached. Upon completion of the reaction excess pressure was blown off, 19.8 grams of dipentene (15.8% by weight of the amount originally charged) being collected in a trap cooled with Dry Ice and acetone.

The product was a yellow, brittle, solid with a ball and ring melting point of 197° F. The product was soluble in mineral spirits and in soybean oil in a concentration of 25% by weight. The solution of gum in soybean oil could be employed as a coating medium. For example, conventional driers such as cobalt oleate or naphthanate could be added in amounts conventional in paints and varnishes to increase the rate of drying. Films of the solution could then be applied to wood, metal or other surfaces and dried to provide protective films.

Example VII

In this example, the autoclave was charged with 750 grams of dicyclopentadiene and 250 grams of 3-vinylcyclohexene. The air in the autoclave was replaced with inert gas (combustion gas—or other inert gas) and the autocalve was sealed. It was then heated with agitation to 260° C. and held at 240 to 265° C. for 5 hours. The pressure rose to 152 pounds per square inch (gauge) at the point when the temperature first reached 260° C. and then fell off rapidly at first and ultimately more slowly reaching a final value of 65 pounds per square inch (gauge) at 260° C.

As in Example VI, the progress of the reaction was followed by withdrawing samples from time to time and determining the body of the solution diluted with 50% by weight of mineral spirits. The run was terminated when the body reached a value of D (Gardner-Holdt). Excess pressure was blown off as in Example VI but a negligible amount of 3-vinylcyclohexene was collected in the trap, cooled by Dry Ice and acetone. The yield may be considered quantitative.

The product was a brittle, yellow solid with a ball and ring melting point of 277° F. It was soluble in mineral spirits and could be applied as a solution therein as a coating medium upon surfaces of various materials including wood.

Example VIII

In accordance with this example, admix about 200 parts by weight of dicyclopentadiene and 58 parts of allyl alcohol in an autoclave. Expel the air with an inert gas such as a mixture of carbon dioxide and nitrogen from combustion of hydrocarbons and heat the mixture to a temperature above 200° C., for example, to 260 to 300° C. until the reaction pressure passes through a maximum and then ceases to rise with further rise of temperature. Excess gas is blown off and recovered if desired.

Example IX

Admix about 200 parts of dicyclopentadiene and 100 parts of allyl acetate in an autoclave. Expel the air from the autoclave, seal the autoclave and heat to a temperature above 200° C. for example, to 260 to 300° C. until the reaction pressure passes through a maximum, drops and ultimately ceases to drop upon increases of temperature. If desired, samples of reaction product can be drawn off from time to time and tested to determine the progress of the reaction through increase of viscosity of the reaction product. At the completion of the reaction, blow off any excess gases in the autoclave as described in the foregoing examples. The product, like most of the products containing an ester with a terminal $>C=CH_2$ group is thought to be a copolymer in which there is reaction between the cyclopentadiene or its lower homopolymer and the ethylenically unsaturated compound. It is thought that many of the reaction products between cyclopentadiene or its lower homopolymers and the ethylenically unsaturated compounds are true conjoint polymers in which the molecules of the two compounds are definitely linked together. This is especially true where the ethylenically unsaturated compound or monomer includes a strongly activating group such as an ester linkage in contiguity to or near the ethylenically unsaturated group in the monomer.

Example X

In accordance with this example, admix about 200 parts by weight of dicyclopentadiene and 98 parts by weight of diallyl ether in an autoclave, displace the air as described in the preceding examples, seal the autoclave and heat to a reaction temperature above 200° C., for example, 260 to 300° F. Again the pressure cycle constitutes a criterion of the progress of the reaction. When it has passed through a maximum and fallen to a minimum, further heating usually is unnecessary. The progress of the reaction can also be followed by drawing off samples of the material periodically and subjecting them to conventional viscosity or melting tests.

In order to incorporate a gum which is a copolymer of cyclopentadiene and styrene as herein disclosed in such oil-phthalic glyceride product, the gum or resin and the alkyd are appropriately heated together as described in connection with the addition of the gum to the drying oils such as linseed oil and soya bean oil.

The substitution of α methyl, β methyl, or ortho, meta, or para methyl styrene for all or a part of the styrene in the foregoing examples is contemplated.

The several applications of the invention herein given are by way of illustration. It will be apparent to those skilled in the art that numerous modifications may be made therein without departure from the spirit of the invention or the scope of the appended claims.

This application is a continuation-in-part of my prior applications Serial No. 470,093 filed December 24, 1942, and No. 568,553 filed December 16, 1944.

I claim:

1. In a method of forming a resinous polymer which is soluble in glyceride oil, the step of heating at a temperature of at least about 250° C., but below the temperature of charring of the components of the system, a mixture consisting of (A) 1 mole of a compound containing the $H_2C=C<$ group and being free of conjugate olefinic groups and (B) at least two times the stoichiometric proportion with respect to compound (A) of a compound of the class consisting of cyclopentadiene and a polymer of cyclopentadiene of the formula

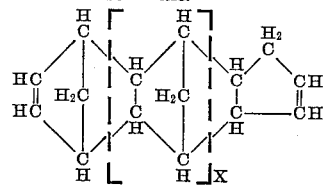

where X is an integer from 0 to 2, until a product is formed which is a drying oil-soluble gum when cooled.

2. A drying oil-soluble gum obtained by the method of claim 1.

3. The method of claim 1 wherein compound (A) is styrene.

4. The method of claim 1 wherein compound (A) is an ester of a carboxylic acid containing a terminal $H_2C=C<$ group.

5. The method of claim 1 wherein compound (A) is methyl methacrylate.

6. The method of claim 1 wherein compound (B) is dicyclopentadiene, the dicyclopentadiene being preliminarily cracked in situ to form cyclopentadiene which then reacts with the compound containing the $H_2C=C<$ group.

7. The method of claim 1 wherein compound (A) is styrene and compound (B) is dicyclopentadiene, the dicyclopentadiene being preliminarily cracked in situ to form cyclopentadiene which then reacts with the compound containing the $H_2C=C<$ group.

8. A method of forming a coating composition which comprises the step of dissolving a drying oil-soluble gum formed by the method of claim 1 in a glyceride drying oil.

9. A glyceride drying oil solution of a gum obtained by the method of claim 1.

10. The steps as defined in claim 1 in which the reaction is effected under superatmospheric pressure.

11. In a method of forming a resinous polymer which is soluble in glyceride oil the step of heating at a temperature in a range of 200 to 350° C., a mixture of (A) 1 mole of a compound of a class consisting of styrene, acrylonitrile and esters of carboxylic acids containing the terminal group $H_2C=C<$ and being free of conjugate olefin groups and (B) 2 to 3 times the stoichiometric proportion with respect to compound (A) of a compound of the class consisting of cyclopentadiene and a polymer of cyclopentadiene of the formula:

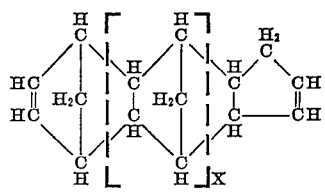

where X is an integer from 0 to 2, until a product is formed which when cold, is a drying oil soluble gum.

12. In a method of forming a resinous polymer which is soluble in glyceride oil, the step of heating under superatmospheric pressure and at a temperature in a range of 250 to 350° C., a mixture of (A) a compound of a class consisting of styrene, acrylonitrile and esters of carboxylic acids and containing the terminal group $H_2C=C<$ and being free of conjugate olefinic groups, and (B) a compound of the formula:

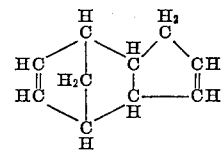

to crack the latter compound in situ to monomeric cyclopentadiene, which in turn reacts with the first mentioned compound to form a glyceride oil-soluble gum.

References Cited in the file of this patent

UNITED STATES PATENTS

| Number | Name | Date |
|---|---|---|
| 2,047,398 | Voss | July 14, 1936 |
| 2,259,496 | Soday | Oct. 21, 1941 |
| 2,348,565 | Ott | May 9, 1944 |
| 2,521,359 | Garber | Sept. 5, 1950 |
| 2,559,790 | Peters | July 10, 1951 |

FOREIGN PATENTS

| Number | Country | Date |
|---|---|---|
| 2,047,398 | Voss | July 14, 1936 |